(12) United States Patent
Sung

(10) Patent No.: US 9,496,737 B2
(45) Date of Patent: Nov. 15, 2016

(54) CHARGE DEVICES AND CHARGE SYSTEMS

(71) Applicant: Wistron Corp., New Taipei (TW)

(72) Inventor: Chun-Yen Sung, New Taipei (TW)

(73) Assignee: WISTRON CORP., New Taipei (TW)

( * ) Notice: Subject to any disclaimer, the term of this patent is extended or adjusted under 35 U.S.C. 154(b) by 216 days.

(21) Appl. No.: 14/301,519

(22) Filed: Jun. 11, 2014

(65) Prior Publication Data

US 2015/0180256 A1 Jun. 25, 2015

(30) Foreign Application Priority Data

Dec. 20, 2013 (TW) .............................. 102147387 A

(51) Int. Cl.
*H02J 7/14* (2006.01)
*H02J 7/00* (2006.01)

(52) U.S. Cl.
CPC .............. *H02J 7/0054* (2013.01); *H02J 7/007* (2013.01); *H02J 7/0042* (2013.01)

(58) Field of Classification Search
USPC ................. 320/103, 106, 111, 116, 132, 163
See application file for complete search history.

(56) References Cited

U.S. PATENT DOCUMENTS

| | | | |
|---|---|---|---|
| 6,690,559 B2 | 2/2004 | Yoshida | |
| 7,158,815 B2 | 1/2007 | Roh | |
| 2002/0167294 A1* | 11/2002 | Odaohhara | H02J 7/0031 320/132 |
| 2007/0210751 A1* | 9/2007 | Wang | H02J 7/0031 320/116 |
| 2008/0012524 A1* | 1/2008 | Yu | H01M 10/44 320/103 |
| 2008/0284371 A1* | 11/2008 | Hsu | H01M 10/44 320/111 |
| 2009/0256529 A1* | 10/2009 | Wang | H02J 7/0072 320/163 |
| 2011/0003223 A1* | 1/2011 | Saeki | H01M 8/04223 429/432 |
| 2011/0068749 A1* | 3/2011 | Maleus | H02J 7/0068 320/162 |
| 2011/0204850 A1* | 8/2011 | Kaino | H02J 7/0029 320/116 |

(Continued)

FOREIGN PATENT DOCUMENTS

| | | |
|---|---|---|
| CN | 1327288 | 12/2001 |
| CN | 1406039 | 3/2003 |

OTHER PUBLICATIONS

Chinese language office action dated Jun. 30, 2016, issued in application No. CN 201410008795.0.

(Continued)

*Primary Examiner* — Brian Ngo
(74) *Attorney, Agent, or Firm* — McClure, Qualey & Rodack, LLP

(57) ABSTRACT

A charge device is provided. The charge device includes a power storage, a transmission circuit, and a determination circuit. The power storage provides an output voltage signal. The transmission circuit is electrically connected to a first node and a detection node. The transmission circuit receives the output voltage signal. When a voltage of the detection node is at a predetermined level, the transmission circuit transmits the output voltage signal to the first node. The determination circuit is electrically connected to the first node. The determination circuit determines whether a voltage value of the output voltage signal is greater than a threshold. When the determination circuit determines that the voltage value of the output voltage signal is greater than the threshold, the charge device generates a charge voltage signal according to the output voltage signal.

16 Claims, 4 Drawing Sheets

(56) References Cited

U.S. PATENT DOCUMENTS

| | | | | |
|---|---|---|---|---|
| 2011/0266998 A1* | 11/2011 | Xiao | ..................... | H02J 7/0073 320/107 |
| 2012/0049800 A1* | 3/2012 | Johnson | ................ | H02J 7/0044 320/111 |
| 2012/0146591 A1* | 6/2012 | Wu | ....................... | H02J 7/0077 320/164 |
| 2012/0268059 A1* | 10/2012 | Nishikawa | ............ | H01M 10/44 320/106 |
| 2013/0038274 A1* | 2/2013 | Forsythe | ............... | H02J 7/0004 320/107 |
| 2013/0076298 A1 | 3/2013 | Miller et al. | | |
| 2013/0113427 A1* | 5/2013 | Noda | .................... | H01M 10/42 320/112 |
| 2013/0119922 A1* | 5/2013 | Chen | .................... | H02J 7/0021 320/107 |

OTHER PUBLICATIONS

English language translation of relevant paragraphs of office action.

\* cited by examiner

CHARGE DEVICES AND CHARGE SYSTEMS

BACKGROUND OF THE INVENTION

Field of the Invention

The invention relates to a charge system, and more particularly to a charge device which can determine whether or not to charge an external device with insufficient power according whether a connection line is connected to a charge connection port when the charge device has sufficient power.

Description of the Related Art

Currently, most people generally carry mobile devices (such mobile phones) to communicate, process e-mails, view video messages, and engage in recreational activities. In order to prevent mobile devices from having insufficient power, users have to carry power banks with them. However, the quality of current power banks is not uniform. When power banks with low quality are charging mobile devices, the power banks may damage the charged mobile device. Thus, users of mobile devices have doubts about using some power banks. When mobile devices have insufficient power and the users do not carry any power banks with them and further cannot find any power adapters, the users are unable to make urgent communications or process important e-mails.

BRIEF SUMMARY OF THE INVENTION

Thus, it is desirable to provide a mobile charge device, which can determine whether or not to charge an external device with insufficient power according whether a connection line is connected to a charge connection port when the mobile charge device has sufficient power.

An exemplary embodiment of a charge device is provided. The charge device comprises a power storage, a transmission circuit, and a determination circuit. The power storage provides an output voltage signal. The transmission circuit is electrically connected to a first node and a detection node. The transmission circuit receives the output voltage signal. When a voltage of the detection node is at a predetermined level, the transmission circuit transmits the output voltage signal to the first node. The determination circuit is electrically connected to the first node. The determination circuit determines whether a voltage value of the output voltage signal is greater than a threshold. When the determination circuit determines that the voltage value of the output voltage signal is greater than the threshold, the charge device generates a charge voltage signal according to the output voltage signal.

An exemplary embodiment of a charge system is provided. The charge system comprises a connection line, a first electronic device, and a second electronic device. The connection line has a first connection terminal and a second connection terminal. The first electronic device is electrically connected to the first connection terminal of the connection line. The first electronic device comprises a first power storage. The second electronic device comprises a second power storage, a transmission circuit, and a determination circuit. The second power storage provides an output voltage signal. The transmission circuit is electrically connected to a first node and a detection node. The transmission circuit receives the output voltage signal. When the second terminal of the connection line is connected to the second electronic device, a voltage of the detection node is at a predetermined level, and the transmission circuit transmits the output voltage signal to the first node according to the predetermined level. The determination circuit is electrically connected to the first node. The determination circuit determines whether a voltage value of the output voltage signal is greater than a threshold. When the determination circuit determines that the voltage value of the output voltage signal is greater than the threshold, the second electronic device generates a charge voltage signal according to the output voltage signal to charge the first power storage through the connection line.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
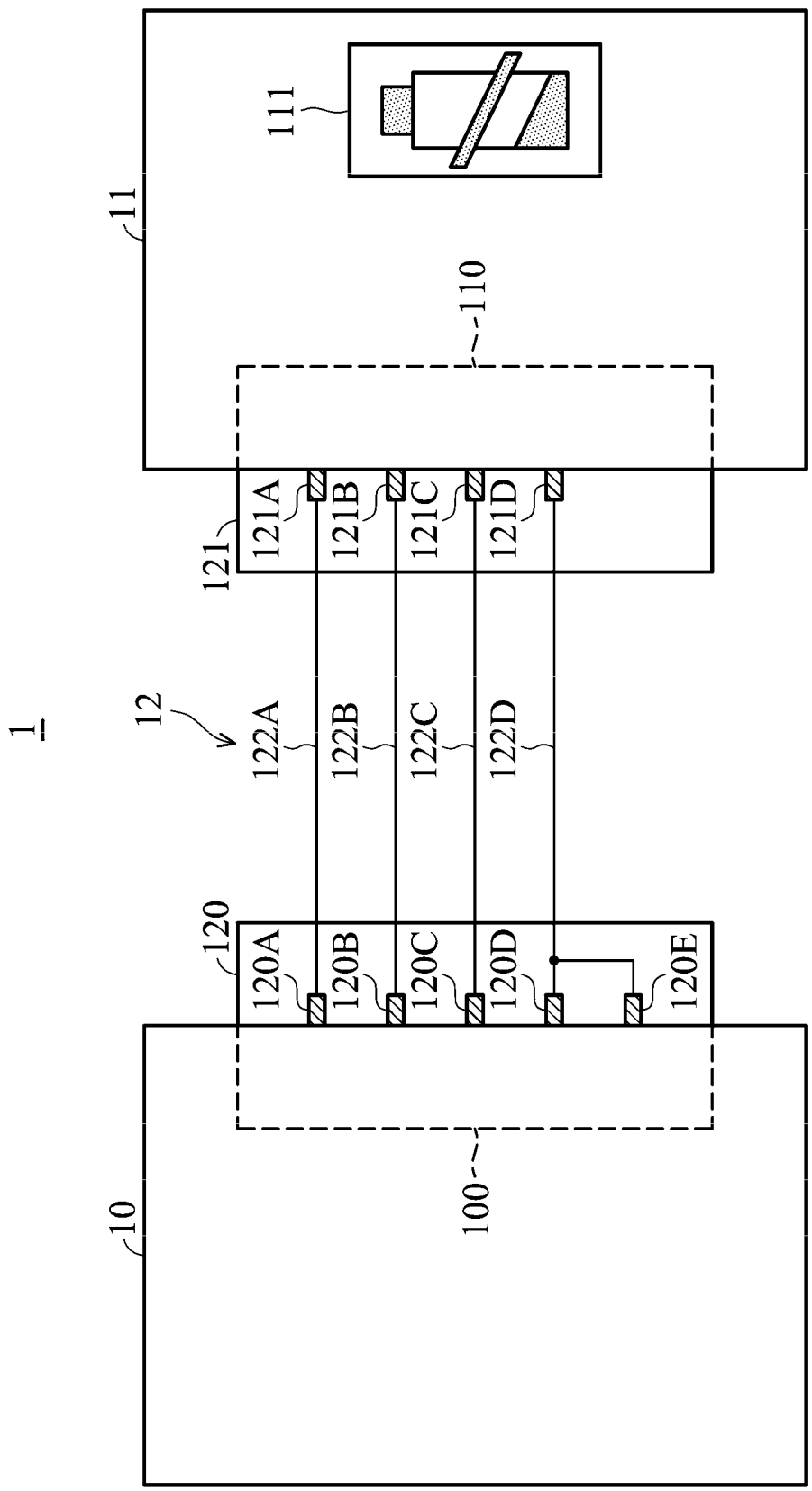
FIG. 1 shows an exemplary embodiment of a charge system.

FIG. 1 shows an exemplary embodiment of a charge system. Referring to FIG. 1, the charge system 1 comprises electronic devices 11 and 12 and a connection line 12. In the embodiment, both of the electronic devices 11 and 12 are mobile phones, for example. The mobile phone 11 comprises a power storage 111. The connection line 12 is implemented by a bus. In an embodiment, the power storage 111 comprises a single battery which can be charged when the single battery has insufficient power. The mobile phone 10 has a connection port 100, and the mobile phone 11 has a connection port 110. The connection line 12 has two connection terminals 120 and 121. The connection terminal 120 has at least five pins 120A~120E, wherein the pins 120D and 120E are connected together. The connection terminal 12 has at least four pins 121A~121D. The pins 120A~120D of the connection terminal 120 are electronically connected to the pins 121A~121D of the connection terminal 121 through leads 122A~122D of the connection line 12, respectively. In order to illustrate the charge system 1, it is assumed that the power storage 111 of the mobile phone 11 currently has insufficient power and the mobile phone 10 has a charge function. The mobile phone 11 can be connected with the mobile phone 10 through the connection line 12. The mobile phone 11 expects that the mobile phone 10 can charge the power storage 111 of the mobile phone 11. When the mobile phones 10 and 11 are connected to and/or communicate with each other through the connection line 12, the connection terminal 120 of the connection line 12 is inserted into the connection port 100 of the mobile phone 10, and the connection terminal 121 is inserted into the connection port 110 of the mobile phone 11. The operations of the mobile phone 10 will be described in the following.

Figure 2:
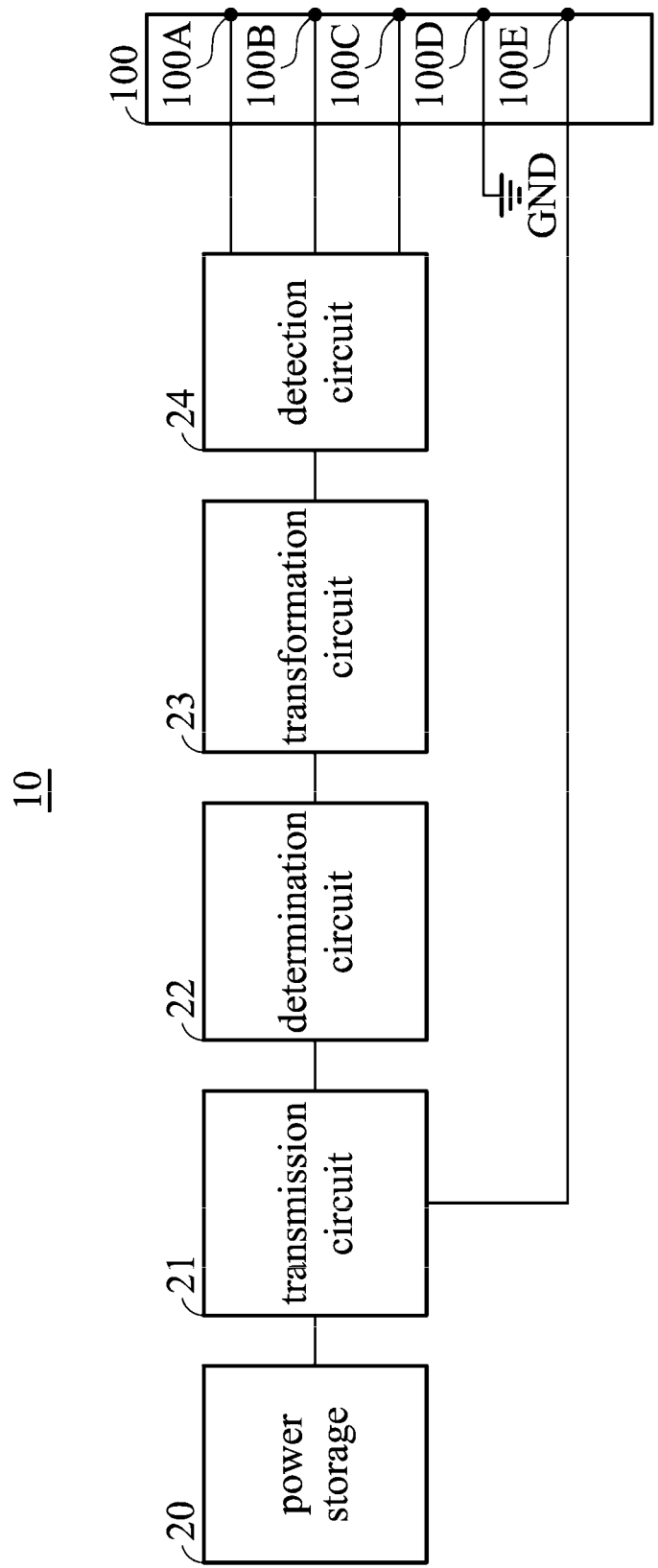
FIG. 2 shows an exemplary embodiment of an electronic device having a charge function.
Figure 3:
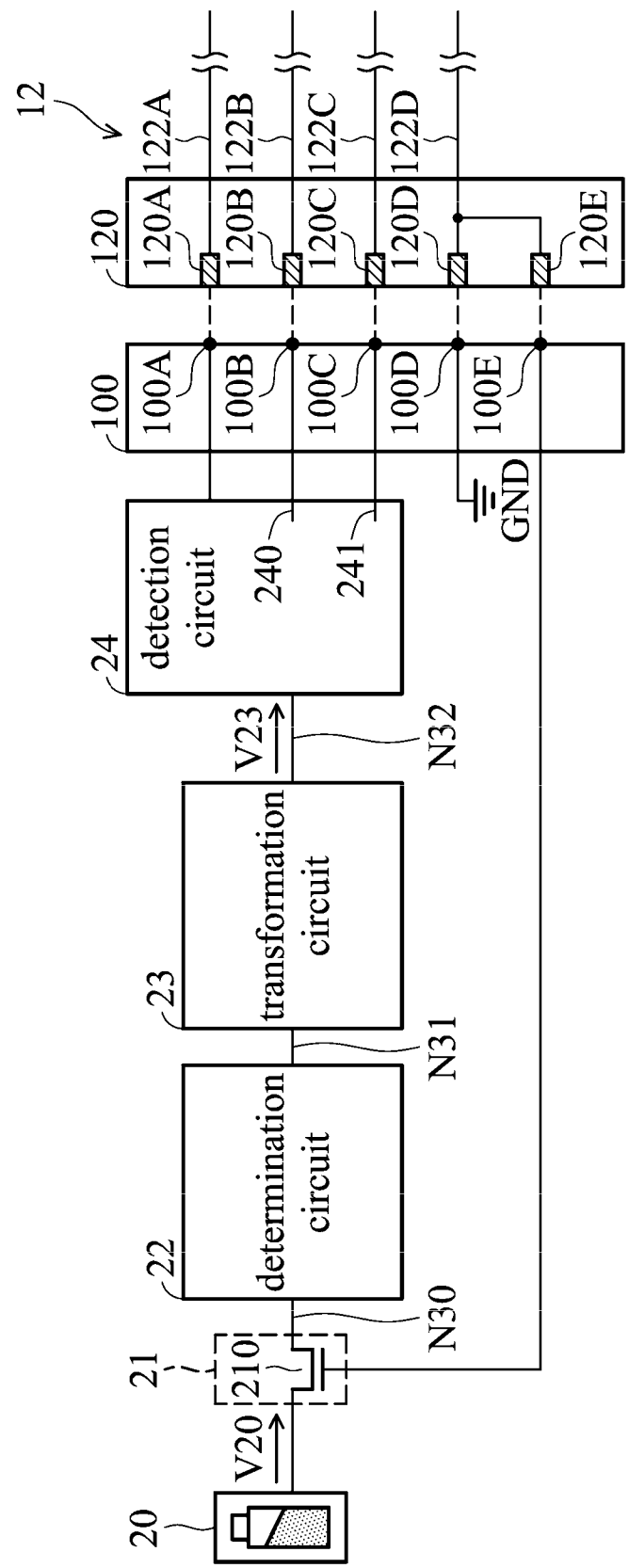
FIG. 3 is a schematic view showing that the electronic device in FIG. 2 is connected to and/or communicates with another electronic device through a connection line.

FIG. 2 shows an exemplary embodiment of the mobile phone 10. Referring to FIG. 2, the mobile phone 10 comprises a power storage 20, a transmission circuit 21, a determination circuit 22, a transformation circuit 23, and a detection circuit 24. In an embodiment, the power storage 20 comprises a single battery which can be charged when the single battery has insufficient power. As shown in FIG. 2, the connector port 100 has at least five nodes 100A~100E, wherein the nodes 100A~100C are electrically connected to the detection circuit 24, the node 100E (serving as a detection node) is electrically connected to the transmission circuit 21, and the node 100D is electrically connected to a ground terminal GND. FIG. 3 is a schematic view showing that the mobile phone 10 is connected to and/or communicates with the mobile phone 11 through the connection line 12. Referring to FIG. 3, in order to clearly present the mobile phone 10, FIG. 3 shows only the mobile phone 10 and the connection line 12. FIG. 3 does not show the mobile phone 11, however, the connection terminal 121 of the connection line 12 is inserted into the connection port 110 of the mobile phone 11.

As shown in FIG. 3, when the connection terminal 120 of the connection line 12 is inserted into the connection port 100 of the mobile phone 10 (the connection between the mobile phone 10 and the connection line 12 is represented by a dotted line), the pins 120A~120C of the connection terminal 120 are electronically connected to the nodes 100A~100D of the connection port 100, respectively, to be further electrically connected to the detection circuit 25, the pin 120D of the connection terminal 120 is electronically connected to the node 100D of the connection port 100 to be further electrically connected to the ground terminal GND, and the pin 120E of the connection terminal 12 is electrically connected to the detection node 100E of the connection port 100 to be further electrically connected to the transmission circuit 21. The battery of the power storage 20 provides an output voltage signal V20 to the transmission circuit 21. The voltage value of the output voltage signal V20 represents the current power magnitude of the battery of the power storage 20. For example, when the battery of the power storage 20 has sufficient power, the voltage value of the output voltage signal V20 is 3V~4.2V. In the embodiment of FIG. 3, the transmission circuit 21 is implemented by a P-type transistor 210. The source (first terminal) of the transistor 210 is electrically connected to the battery of the power storage 20 to receive the output voltage signal V20, the drain (second terminal) thereof is electrically connected to a node N30, and the gate (control terminal) thereof is electrically connected to the detection node 100E. When the connection terminal 120 of the connection line 12 is inserted into the connection port 100, the voltage of the detection node 100E which is electrically connected to the pin 120E is at the low level (predetermined level) of the ground terminal GND because the pin 120D is electrically connected to the ground terminal GND via the node 100D and the pins 120D and 120E are connected together. The transistor 210 is turned on according to the low level at the detection node 100E to transmit the output voltage signal V20 to the node N30.

The determination circuit 22 is electrically connected between the node N30 and a node N31. The determination circuit 22 receives the output voltage signal V20 at the node N30. The determination circuit 22 determines whether the voltage value of the output voltage signal V20 is greater than a predetermined threshold (such as 3.2V). When the determination circuit 22 determines that the voltage value of the output voltage signal V20 is greater than the predetermined threshold, the determination circuit 22 transmits the output voltage signal V20 to the node N30. When the determination circuit 22 determines that the voltage value of the output voltage signal V20 is less than or equal to (not greater than) the predetermined threshold, the determination circuit 22 does not transmit the output voltage signal V20 to the node N30 or stops transmitting the output voltage signal V20 to the node N30. The purpose of the determination operation performed by the determination circuit 22 is to prevent the mobile phone 10 from charging the mobile phone 11 when the power of the battery of the power storage 20 is not great enough. If the mobile phone 10 charges the mobile phone 11 when the power of the battery of the power storage 20 is not great enough, the battery of the power storage 20 has insufficient power. In other words, through the above determination operation, the determination circuit 22 limits the mobile phone 10 to charge the mobile phone 11 only when the power of the battery of the power storage 20 is great enough. The transformation circuit 23 is electrically connected between the node N31 and a node N32. When the determination circuit 22 transmits the output voltage signal V20 to the node N31, the transformation circuit 23 receives the output voltage signal V20 and changes the voltage value and a current value of the output voltage signal V20 to specific values for generating a charge voltage signal V23 at the node N32. For example, the transformation circuit 23 transfers the voltage value of the output voltage signal V20 to 5V and the current value of the output voltage signal V20 to 500 mA. Thus, the charge voltage signal V23 is composed of 5V voltage and 500 mA current. The specific values of the charged/transformed the output voltage signal V20 can be determined according to the specification and type of the charge system 1.

The detection circuit 24 is electrically connected to the node N32 to receive the charge voltage signal V23. The detection circuit 24 is also electrically connected to the nodes 100A~100C. The detection circuit 24 has detection pins 240 and 241 which are electrically connected to the pins 100B and 100C of the connection port 100. The detection circuit 24 performs a matching operation with the connection port mode of the mobile phone 11 waiting to be charged through the detection pins 240 and 241, the nodes 100B and 100C, the pins 120B and 120C of the connection terminal 120, and the pins 121B and 121C of the connection terminal 121. The detection circuit 24 further changes the states of the detection pins 240 and 241 according to the detected connection port mode. For example, the states are changed to a situation in which both of the detection pins 240 and 241 are electrically connected to the ground terminal GND or a specific resistor is electrically connected between the detection pins 240 and 241. The detection circuit 24 performs the matching operation with the mobile phone 11 according to the states of the detection pins 240 and 241. When the states of the detection pins 240 and 241 are changed to a specific state and the matching between the mobile phones 10 and 11 is achieved, the mobile phone 11 can be charged by the mobile phone 10. The detection circuit 24 will transmit the charge voltage signal V23 to the node 100A of the connection port 100 and further transmit the charge voltage signal V23 to the mobile phone 11 through the pins 120A and 121A. Then, the mobile phone 11 charges the battery of the power storage 111 by the received charge voltage signal V23 and through a charge circuit of the mobile phone 11. At this time, the mobile phone 10 serves as a charge device which charges the battery of the power storage 111 in the mobile phone 11. In an embodiment, when it is determined that the mobile phone 10 is able to charge the mobile phone 11 due to the achieved matching between the mobile phones 10 and 11, the detection circuit 24 can perform a current limitation operation to the charge voltage signal V23 before the detection circuit 24 transmits the charge voltage signal V23 to the node 100A of the connection port 100. For example, the detection circuit 24 transfers the charge voltage signal V23 with 5V/500 mA to the charge voltage signal V23 with 5V/400 mA. Accordingly, the mobile phone 11 charges the battery of the power storage 111 by the charge voltage signal V23 with 5V/400 mA. When the matching between the mobile phones 10 and 11 is not unsuccessful, the mobile phone 11 will be allowed to be charged by the mobile phone 10.

According the above description, in a situation in which the connection port mode of the mobile phone 11 conforms with the charge function of the mobile phone 10 and the battery of the power storage 20 in the mobile phone 10 has sufficient power, when the battery of the power storage 111 in the mobile phone 11 has insufficient power, the mobile phone 11 is connected to and/or communicates with the mobile phone 10 only through the connection line 12 and then obtains the charge voltage signal V23 from the mobile phone 10. Since the charge voltage signal V23 is generated by the battery of the power storage 20 in the mobile phone 10, the charge voltage signal V23 does not easily damage the mobile phone 10 during the charge process due to general voltage specifications of current mobile phones.

The above embodiments only recite that the mobile phone 11 can be charged. In other embodiments, the mobile phone 11 can also perform the same charge operation of the mobile phone 10. In other words, the mobile phone 11 also comprises the transmission circuit 21, the determination circuit 22, the transformation circuit 23, the detection circuit 24, and the connection port 100 to perform the above charge operation. In some embodiments, both of the mobile phones 10 and 11 have the above charge function, and both of the power storages of the mobile phones 10 and 11 can be charged. For example, the mobile phones 10 and 11 are manufactured by the same manufacturer or have the same model number, or the mobile phones 10 and 11 are not manufactured by the same manufacturer but both of them have the above charge function. When the battery of the power storage 111 in the mobile phone 11 has insufficient power, the user of the mobile phone 11 is able to connect with the mobile phone 10 through the connection line 12 for obtaining the charge voltage signal V23. Similarly, when the battery of the power storage 20 in the mobile phone 10 has insufficient power, the user of the mobile phone 10 is able to connect with the mobile phone 11 through the connection line 12 for obtaining a charge voltage signal.

Figure 4:
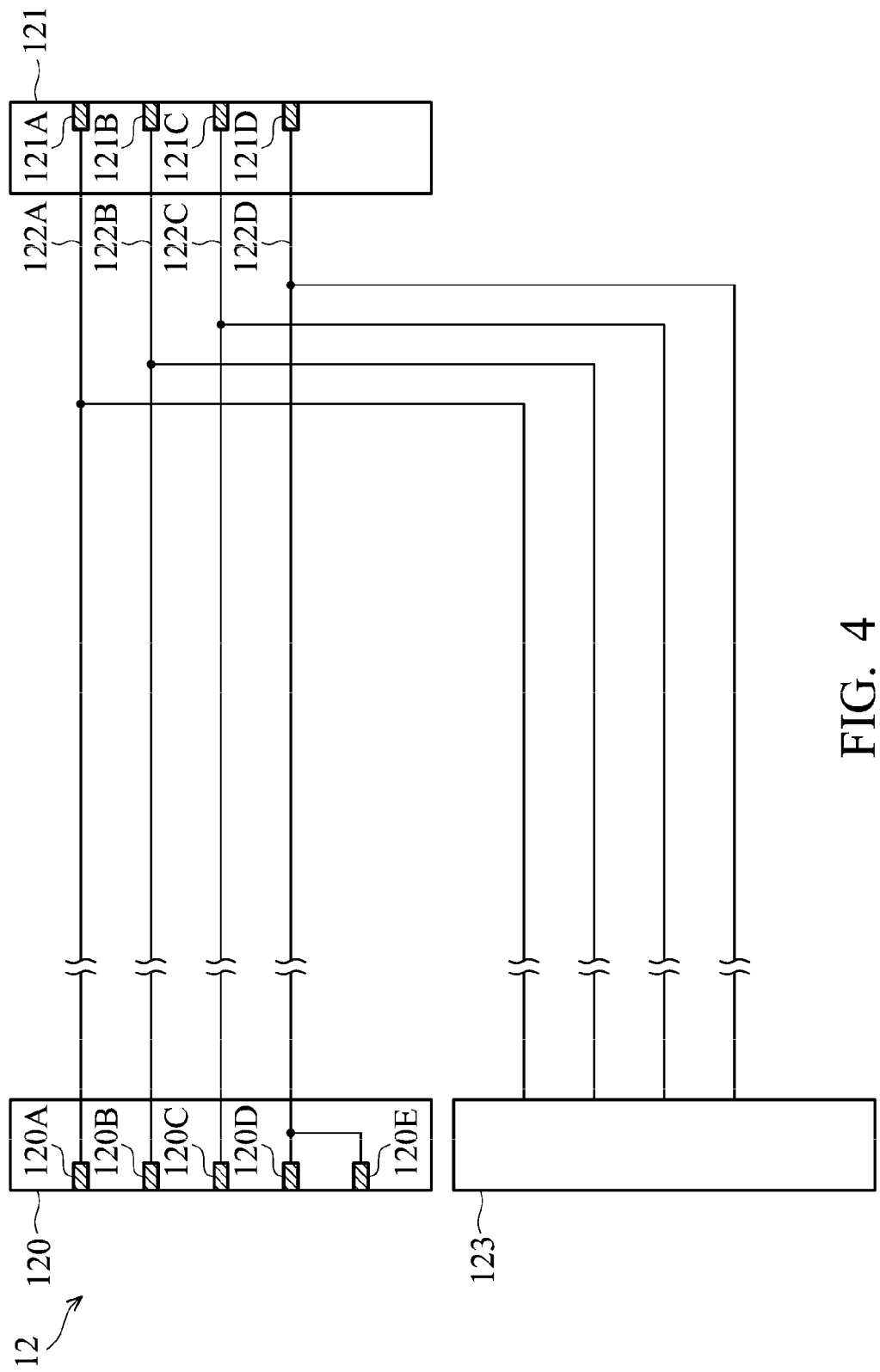
FIG. 4 shows an exemplary embodiment of a connection line.

FIG. 4 shows an exemplary embodiment of the connection line 12. In the embodiments in FIGS. 1-3, the connection line 12 has the two connection terminals 120 and 121. In other embodiments, the connection line 12 further has connection terminal 123 which can be connected to an AC/DC converter. The connection terminal 123 may have different input/output (I/O) interference specifications from the connection terminals 121 and 122, such as a USB specification. Thus, the connection line 12 in the embodiment of FIG. 4 is configured for different charge sources: one is the AC/DC converter, and another is an electronic device (such as a mobile phone) having the above charge function.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charge device comprising:
    a power storage providing an output voltage signal;
    a transmission circuit electrically connected to a first node and a detection node and receiving the output voltage signal, wherein when a voltage of the detection node is at a predetermined level, the transmission circuit transmits the output voltage signal to the first node; and
    a determination circuit electrically connected to the first node and determining whether a voltage value of the output voltage signal is greater than a threshold,
    wherein when the determination circuit determines that the voltage value of the output voltage signal is greater than the threshold, the charge device generates a charge voltage signal according to the output voltage signal.

2. The charge device as claimed in claim 1 further comprising:
    a connection port electrically connected to the detection node,
    wherein when a connection line is connected to the connection port, the voltage of the detection node is at the predetermined level.

3. The charge device as claimed in claim 2 further comprising:
    a transformation circuit electrically connected to the determination circuit,
    wherein when the determination circuit determines that the voltage value of the output voltage signal is greater than the threshold, the determination circuit transmits the output voltage signal to the transformation circuit, and the transformation circuit changes the voltage value and a current value of the output voltage signal to generate the charge voltage signal.

4. The charge device as claimed in claim 3 further comprising:
    a detection circuit receiving the charge voltage signal, having a first detection pin and a second detection pin which are electrically connected to the connection port, and changing states of the first detection pins and the second detection pin,
    wherein when the detection circuit changes the states of the first detection pin and the second detection pin to a specific state, the detection circuit transmits the charge voltage signal to the connection port.

5. The charge device as claimed in claim 4, wherein the detection circuit performs a current limitation operation to the charge voltage signal.

6. The charge device as claimed in claim 1, wherein the transmission circuit comprises:
    a transistor having a first terminal electrically connected to the power storage, a second terminal electrically connected to the first node, and a control terminal electrically connected to the detection node.

7. The charge device as claimed in claim 6 further comprising:
    a connection port electrically connected to the detection node,
    wherein when a connection line is connected to the connection port, the voltage of the detection node is at the predetermined level to turn on the transistor.

8. The charge device as claimed in claim 1, wherein the power storage is able to be charged.

9. A charge system comprising:
a connection line having a first connection terminal and a second connection terminal;
a first electronic device electrically connected to the first connection terminal of the connection line and comprising:
a first power storage; and
a second electronic device comprising:
a second power storage providing an output voltage signal;
a transmission circuit electrically connected to a first node and a detection node and receiving the output voltage signal, wherein when the second terminal of the connection line is connected to the second electronic device, a voltage of the detection node is at a predetermined level, and the transmission circuit transmits the output voltage signal to the first node according to the predetermined level; and
a determination circuit electrically connected to the first node and determining whether a voltage value of the output voltage signal is greater than a threshold,
wherein when the determination circuit determines that the voltage value of the output voltage signal is greater than the threshold, the second electronic device generates a charge voltage signal according to the output voltage signal to charge the first power storage through the connection line.

10. The charge system as claimed in claim 9, wherein the second electronic device further comprises:
a connection port electrically connected to the detection node,
wherein when the second connection terminal of the connection line is connected to the connection port, the voltage of the detection node is at the predetermined level.

11. The charge system as claimed in claim 10, wherein the second electronic device further comprises:
a transformation circuit electrically connected to the determination circuit,
wherein when the determination circuit determines that the voltage value of the output voltage signal is greater than the threshold, the determination circuit transmits the output voltage signal to the transformation circuit, and the transformation circuit changes the voltage value and a current value of the output voltage signal to generate the charge voltage signal.

12. The charge system as claimed in claim 11, wherein the second electronic device further comprises:
a detection circuit receiving the charge voltage signal, having a first detection pin and a second detection pin which are electrically connected to the connection port, and changing states of the first detection pins and the second detection pin,
wherein when the second connection terminal of the connection line is connected to the second electronic device, the detection circuit changes the states of the first detection pin and the second detection pin to a specific state, and
wherein the detection circuit transmits the charge voltage signal to the connection port according to the specific state.

13. The charge system as claimed in claim 12, wherein the detection circuit performs a current limitation operation to the charge voltage signal.

14. The charge system as claimed in claim 9, wherein the transmission circuit comprises:
a transistor having a first terminal electrically connected to the second power storage, a second terminal electrically connected to the first node, and a control terminal electrically connected to the detection node.

15. The charge system as claimed in claim 14, wherein the second electronic device further comprises:
a connection port electrically connected to the detection node,
wherein when the second connection terminal of the connection line is connected to the connection port, the voltage of the detection node is at the predetermined level to turn on the transistor.

16. The charge system as claimed in claim 9, wherein the second power storage is able to be charged.

* * * * *